(12) United States Patent
Thomas et al.

(10) Patent No.: US 7,421,363 B2
(45) Date of Patent: Sep. 2, 2008

(54) METHOD FOR VIRTUAL INSPECTION OF VIRTUALLY MACHINED PARTS

(75) Inventors: Steven M. Thomas, Saginaw, MI (US); Diane M. Landers, Frankenmuth, MI (US)

(73) Assignee: Delphi Technologies, Inc., Troy, MI (US)

(*) Notice: Subject to any disclaimer, the term of this patent is extended or adjusted under 35 U.S.C. 154(b) by 564 days.

(21) Appl. No.: 10/358,873

(22) Filed: Feb. 5, 2003

(65) Prior Publication Data

US 2003/0204284 A1 Oct. 30, 2003

Related U.S. Application Data

(60) Provisional application No. 60/375,621, filed on Apr. 26, 2002.

(51) Int. Cl.
*G06F 19/00* (2006.01)

(52) U.S. Cl. .................. 702/113; 364/512; 364/474.21; 364/474.35; 364/559; 356/376; 356/379; 700/95; 700/96; 700/97; 700/98; 700/94; 700/103; 700/118; 703/1; 703/2; 345/764; 345/850; 345/853

(58) Field of Classification Search ................. 702/113; 700/98
See application file for complete search history.

(56) References Cited

U.S. PATENT DOCUMENTS

| | | | |
|---|---|---|---|
| 5,184,426 A | 2/1993 | Minatani | 51/165.71 |
| 5,351,196 A | 9/1994 | Sowar et al. | 364/474.24 |
| 5,434,791 A | 7/1995 | Koko et al. | 364/468 |
| 5,467,293 A | 11/1995 | Summer et al. | 364/578 |
| 5,659,493 A | 8/1997 | Kiridena et al. | 364/578 |
| 5,691,909 A | 11/1997 | Frey et al. | 364/474.01 |
| 5,710,709 A | 1/1998 | Oliver et al. | 364/474.26 |
| 5,768,136 A | 6/1998 | Fujiwara et al. | 364/474.24 |
| 5,793,647 A | 8/1998 | Hageniers et al. | 364/507 |
| 5,808,432 A | 9/1998 | Inoue et al. | 318/561 |
| 5,815,154 A | 9/1998 | Hirschtick et al. | 345/356 |
| 5,946,100 A * | 8/1999 | Ishihara | 356/608 |
| 5,949,693 A * | 9/1999 | Tandler | 703/1 |
| 6,073,056 A | 6/2000 | Gawronski et al. | 700/98 |
| 6,120,171 A | 9/2000 | Shaikh | 364/468.04 |
| 6,219,049 B1 | 4/2001 | Zuffante et al. | 345/339 |

(Continued)

OTHER PUBLICATIONS

Hemmett, Fussell, Jerard: "A Robust and Efficient Approach to Feedrate Selection for 3-axis Machining" ASME International Mechanical Engineering Congress and Exposition, Nov. 2000.

(Continued)

*Primary Examiner*—John Barlow
*Assistant Examiner*—Sujoy Kundu
(74) *Attorney, Agent, or Firm*—Michael D. Smith

(57) ABSTRACT

A method for implementing a virtual inspection of a virtually machined workpiece is disclosed. In an exemplary embodiment, the method includes defining a set of master reference planes, defining a set of positioning planes with respect to the set of master reference planes, and defining a pair of intersecting cutting planes from the set of positioning planes. The pair of intersecting cutting planes define an inspection line at the intersection thereof, wherein the inspection line is swept through a selected area of the workpiece, thereby collecting inspection data for the workpiece.

14 Claims, 16 Drawing Sheets

U.S. PATENT DOCUMENTS

| | | | |
|---|---|---|---|
| 6,219,055 B1 | 4/2001 | Bhargava et al. | 345/355 |
| 6,263,252 B1 | 7/2001 | St. Ville | 700/98 |
| 6,323,863 B1 | 11/2001 | Shinagawa et al. | 345/441 |
| 6,341,153 B1 | 1/2002 | Rivera et al. | 378/4 |
| 6,341,996 B1 | 1/2002 | Brien et al. | 451/8 |
| 6,356,800 B1 | 3/2002 | Monz et al. | 700/184 |
| 6,430,455 B1 | 8/2002 | Rebello et al. | 700/105 |
| 6,599,125 B1 | 7/2003 | Freilich et al. | 433/212.1 |
| 6,629,065 B1 | 9/2003 | Gadh et al. | 703/1 |
| 6,735,489 B1 * | 5/2004 | Khurana et al. | 700/95 |
| 2002/0133252 A1 | 9/2002 | Landers et al. | 700/97 |
| 2002/0133253 A1 | 9/2002 | Landers et al. | 700/98 |
| 2002/0133264 A1 | 9/2002 | Maiteh et al. | 700/182 |
| 2002/0133265 A1 | 9/2002 | Landers et al. | 700/182 |
| 2002/0133266 A1 | 9/2002 | Landers et al. | 700/182 |
| 2002/0133267 A1 | 9/2002 | Landers et al. | 700/182 |
| 2002/0133803 A1 | 9/2002 | Landers et al. | 717/104 |
| 2002/0152000 A1 | 10/2002 | Landers et al. | 700/98 |
| 2003/0004596 A1 | 1/2003 | Landers et al. | 700/98 |
| 2003/0033041 A1 | 2/2003 | Richey | 700/98 |
| 2003/0114945 A1 | 6/2003 | Hirano et al. | 700/97 |

OTHER PUBLICATIONS

Roth D et al: "Surface swept by a toroidal cutter during 5-axis machining" Computer Aided Design, Elsevier Publishers BV., Barking, GB, vol. 33, No. 1, Jan. 2001, pp. 57-63.

Spence A D et al: "Integrated solid modeller based solutions for machining" Computer Aided Design, Elsevier Publishers BV., Barking, GB, vol. 32, No. 8-9, Aug. 2000, pp. 553-568.

Wang W P et al: "Geometric Modeling for Swept Volume of Moving Solids" IEEE Computer Graphics and Applications, IEEE Inc. New York, US, vol. 6, No. 12, Dec. 1, 1986, pp. 8-17.

Solid Edge User's Guide Version 6, MU28900-ENG, by Unigraphics Solutions, 1998, pp. 28,29,33,90,91,96,157, and 178.

Artificial Intelligence (Understanding Computers Series), Time-Life Books, 1986, ISNBN-0-8094-5675-3, pp. 36-43.

U.S. Appl. No. 10/355,310, filed Jan. 31, 2003, Landers et al.
U.S. Appl. No. 10/355,326, filed Jan. 31, 2003, Khurana.
U.S. Appl. No. 10/355,355, filed Jan. 31, 2003, Landers et al.
U.S. Appl. No. 10/355,662, filed Jan. 31, 2003, Landers et al.
U.S. Appl. No. 10/355,749, filed Jan. 31, 2003, Landers et al.
U.S. Appl. No. 10/355,763, filed Jan. 31, 2003, Landers et al.
U.S. Appl. No. 10/358,870, filed Feb. 5, 2003, Thomas et al.
U.S. Appl. No. 10/358,874, filed Feb. 5, 2003, Thomas et al.

William H. Beyer, Ph.D., editor; CRC Handbook of Mathematical Sciences, 5th Edition, 1978, pp. 354-355.

Sridhar S. Condoor,"Integrating Design in Engineering Graphics Courses Using Feature-Based, Parametric Solid Modeling," ASEE/ IEEE Frontiers in Education Conference 12d2-13; 1999; pp. 12d2-13-12d2-17.

Chih-Hsing Chu and Chun-Fong You; "Operation Planning in NC Programming Based on CAD Systems," found at http://dnclab.berkeley.edu/lma/people/chchu/paper/NCoptim.html.

Solid Edge User's Guide Version 12 2002.

What's New in Unigraphics V18 User Guide 2001.

\* cited by examiner

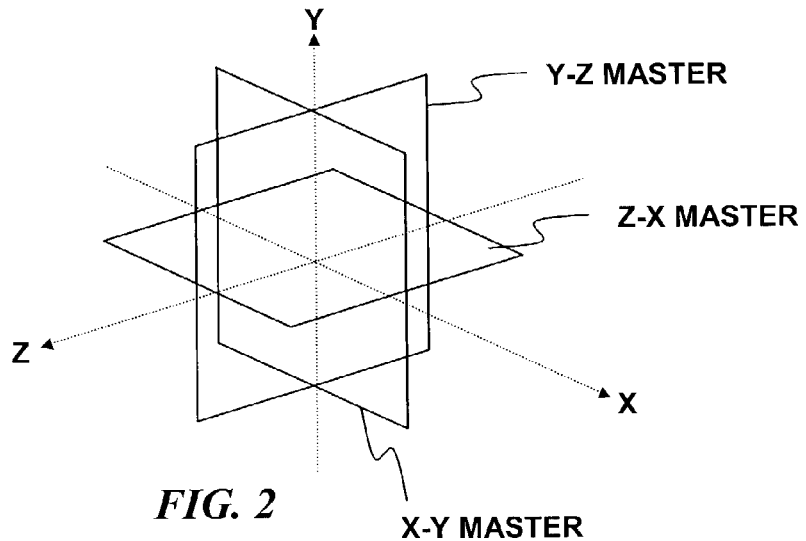
FIG. 2
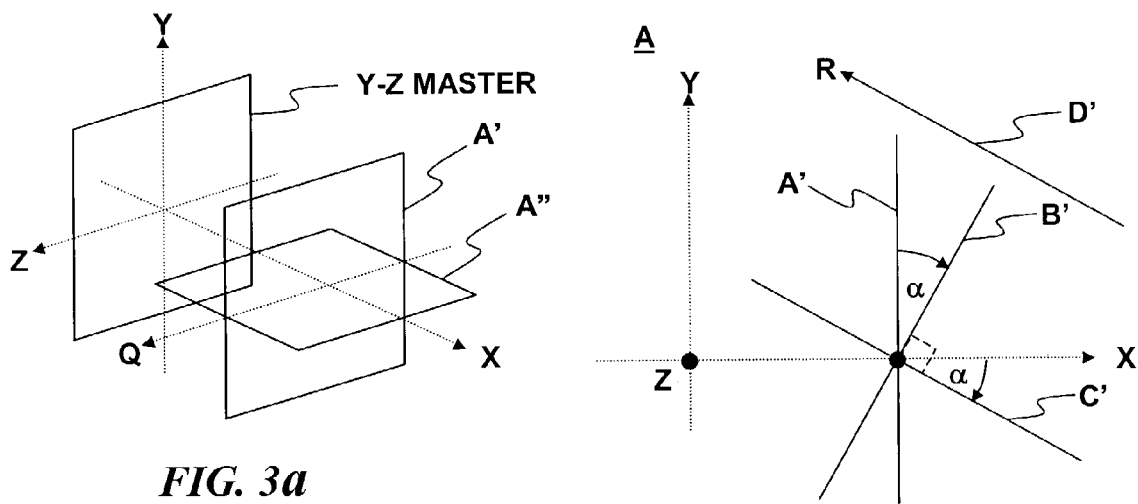
FIG. 3a
FIG. 3b
FIG. 3c

METHOD FOR VIRTUAL INSPECTION OF VIRTUALLY MACHINED PARTS

CROSS-REFERENCE TO RELATED APPLICATIONS

This application claims the benefit of U.S. provisional application No. 60/375,621, filed Apr. 26, 2002 the contents of which are incorporated by reference herein in their entirety.

BACKGROUND

The present disclosure relates generally to computer aided design and manufacturing (CAD/CAM) and, more particularly, to a method for virtual inspection of virtually machined parts.

In numerically controlled (NC) milling technology, a tool or cutter is directed through a set of pre-recorded sequential trajectories to fabricate a desired shape from raw stock. This technology is capable of producing free-formed, sculptured surfaces while maintaining tight milling error tolerances. Consequently, NC milling technology is widely used in the production of complicated, high-precision products such as molds, dies, aerospace parts, etc. These products, especially molds and dies, typically influence many other subsequent production processes. In order to improve the accuracy and reliability of NC milling, certain verification methods are used to check milling tool paths for potential problems such as milling error, collision, and improper machining parameters, among others. Analytical methods are implemented to graphically simulate the milling process off-line and, in some cases, verify milling error, tool assembly collision, and other machining parameters. Thus, NC programmers can visualize the shape of milled parts and understand potential problems in an efficient, less expensive, and more accurate way.

Direct solid modeling is one approach used in simulating the material removal process, implemented through direct Boolean difference operations between a solid model of the workpiece and solid models of swept volumes of the milling tool. The milling process may be realistically simulated, resulting in an explicit solid model of the milled workpiece that may be graphically presented and reviewed. Since the milled part is explicitly defined by a solid representation, a subsequent analysis and computation of milling error, volume removal rate, or milling dynamics can be readily performed.

In the real world, the inspection of a milled part may be accomplished with a coordinate measuring machine (CMM), in which a small probe or pointer is used to trace the three-dimensional surfaces of the part in order to measure the specific dimensions thereof. Since such an inspection process assists in decreasing time and expense in the actual manufacturing of parts, it is also desirable to have a similar process for the verification of a mathematical-based, virtual machining application as described above.

SUMMARY

The above discussed and other drawbacks and deficiencies of the prior art are overcome or alleviated by a method for implementing a virtual inspection of a virtually machined workpiece. In an exemplary embodiment, the method includes defining a set of master reference planes, defining a set of positioning planes with respect to the set of master reference planes, and defining a pair of intersecting cutting planes from the set of positioning planes. The pair of intersecting cutting planes define an inspection line at the intersection thereof, wherein the inspection line is swept through a selected area of the workpiece, thereby collecting inspection data for the workpiece.

In one aspect, the intersecting cutting planes further include a first cutting plane rotatable about a first axis, and a second cutting plane rotatable about a second axis. Rotation of the first cutting plane determines a path position of the inspection line, and rotation of the second cutting plane determines a contact angle between the inspection line and the workpiece. The first axis is defined by the intersection between a first positioning plane and a second positioning plane, while the second axis is defined by the intersection between a third positioning plane and a fourth positioning plane. The fourth positioning plane is perpendicular to said first cutting plane.

BRIEF DESCRIPTION OF THE DRAWINGS

Referring to the exemplary drawings wherein like elements are numbered alike in the several Figures:

FIG. 2 is a perspective view of a set of fixed master planes used in accordance with the method of FIG. 1;

FIG. 3(a) is a perspective view of a set of positioning planes used in accordance with the method of FIG. 1;

FIGS. 3(b) and 3(c) illustrate the definition of a pair of cutting planes used in accordance with the method of FIG. 1;

DETAILED DESCRIPTION

Disclosed herein is a method for implementing a virtual inspection of a virtually machined workpiece. Briefly stated, the inspection process is controlled through a series of master planes, positioning planes and cutting planes. Three master planes (x-y, y-z and z-x) serve as a fixed reference. From these fixed reference planes, a corresponding set of positioning planes are offset and rotated from the master planes to provide positioning for a pair of cutting planes. The cutting planes are defined to be non-parallel and therefore intersect along an "inspection" line that is used as a virtual inspection probe. This inspection line is then passed through a virtual part to be measured, wherein an inspection point on the part is defined by the intersection of the inspection line and the part. By changing the positioning of one or both of the cutting planes, the inspection line is caused to be swept through a selected area of the virtual part for data collection. The same process may be done over the desired part print model in order to collect reference points for comparison.

Figure 1:
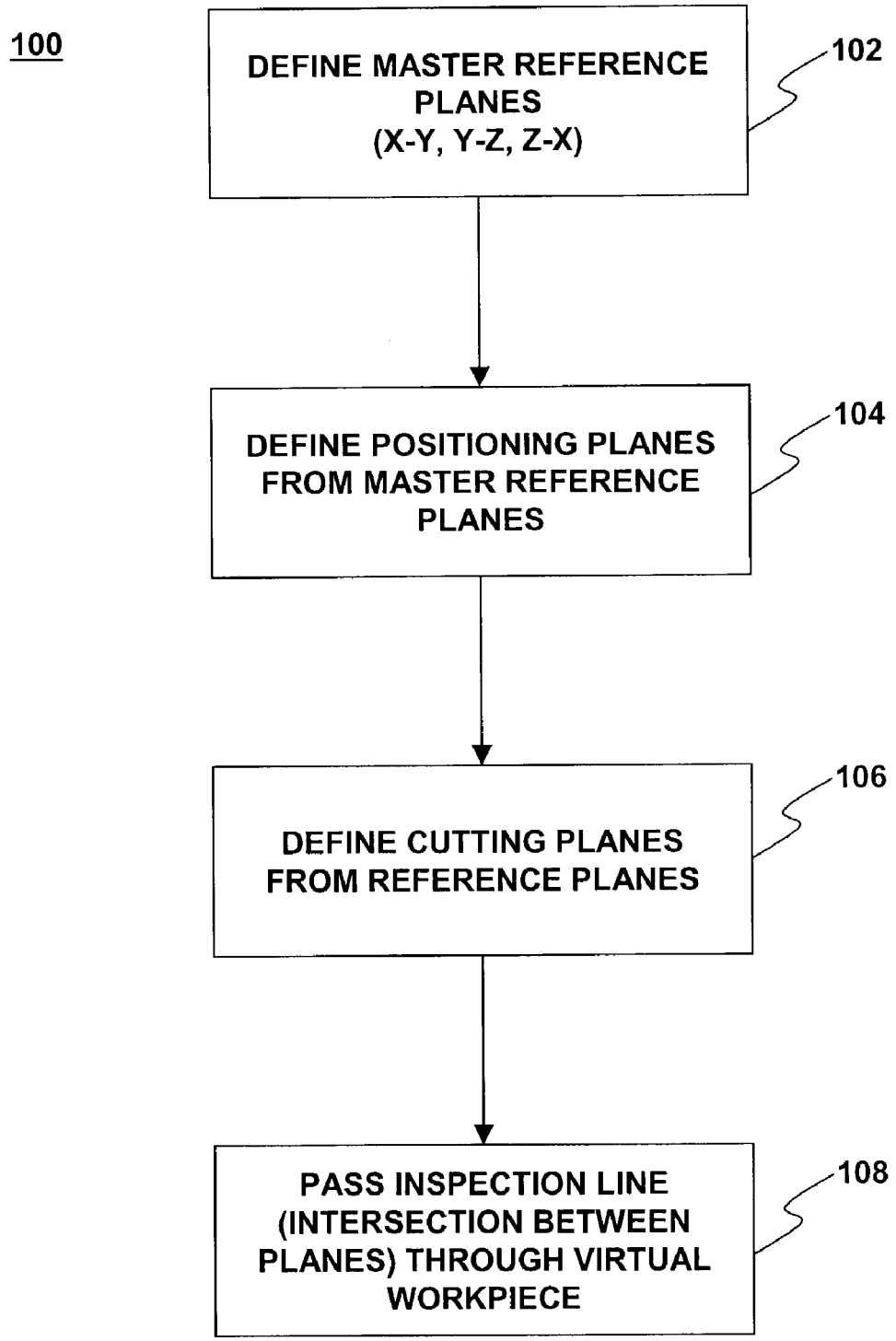
FIG. 1 is a block diagram illustrating a method for implementing a virtual inspection of a virtually machined workpiece, in accordance with an embodiment of the invention.

Referring initially to FIG. 1, there is shown a block diagram that illustrates a method 100 for implementing a virtual inspection of a virtually machined workpiece, as described above. The method 100 begins at block 102, where a series of three mutually perpendicular, fixed master reference planes are defined. More particularly, the fixed master planes are designated as an x-y plane, a y-z plane and a z-x plane, as is shown in FIG. 2. Once the master reference planes have been defined, a set of positioning planes may be defined therefrom, as shown at block 104. The positioning planes will include a set of "offset" planes, which may be positioned parallel with respect to the master planes. In addition, the positioning planes will also include one or more perpendicular or parallel planes disposed with respect to the cutting planes, as described later.

Method 100 then continues to block 106, where a pair of cutting planes are defined from the positioning planes. As stated earlier, the cutting planes are not parallel with respect to one another, and therefore intersect at a line, referred to hereinafter as an inspection line. At block 108, the inspection line is used as a virtual inspection probe to be passed through a virtually machined workpiece. Each cutting plane is pivotally disposed about a defined axis, thus the inspection line may be through along a desired area of the workpiece by rotating one or both of the cutting planes.

The above described process is further understood with reference to FIGS. 3(a) through 3(c), which illustrate the formation of exemplary cutting planes. FIG. 3(a) shows the location of defined positioning planes A, A' and A", associated with the x-y, y-z and z-x master planes, respectively. In the present example, positioning plane A is set to have an offset of zero, thus positioning plane A is equal to the x-y master plane in this instance. In addition, positioning plane A" is also set to have an offset of zero, meaning A" lies in the z-x master plane. However, positioning plane A' is defined with an offset distance along the positive x-axis direction, and therefore A' is parallel to the y-z master plane. It can be seen, therefore that the intersection of A' and A" (z-x master plane), defines a line which is designated as the Q-axis.

Referring now to FIG. 3(b), a first cutting plane, B', is defined. It will be noted that FIG. 3(b) is a view taken along the negative z-direction with respect to FIG. 3(a). Beginning with position plane A', the first cutting plane B' may occupy any planar position that pivots about the Q-axis. By way of example, B' is rotated by an acute angle, $\alpha$, from A'. The first cutting plane B' will control the path position for the subsequently defined inspection line along the virtual workpiece. Once B' is defined, another positioning plane, C', is defined as being perpendicular to B'. If B' is caused to be rotated, then C' is correspondingly rotated to maintain its perpendicular orientation with respect to C'.

Next, another positioning plane, D', is defined as a parallel offset to C', as also shown in FIG. 3(b). The resulting intersection of positioning planes D' and A yields another line which is designated as the R-axis. From the R-axis, a second cutting plane, B, is defined as being capable of occupying any planar position pivoting about the R-axis, beginning with positioning plane A. The second cutting plane B will control the contact angle between the inspection line and the surface of the workpiece. FIG. 3(c) is a view along the R-axis direction, and more clearly illustrates the relationship between second cutting plane B and positioning plane A. By way of example, cutting plane B is shown offset from positioning plane by an acute angle, $\theta$, about the R-axis.

FIG. 3(c) also illustrates a pair of additional planes, C and D, which are offset from the x-y master plane on opposite sides of positional plane A. Planes C and D are used as "trim planes" to establish boundaries for second cutting plane B as it pivots about the R-axis.

Figure 4A:
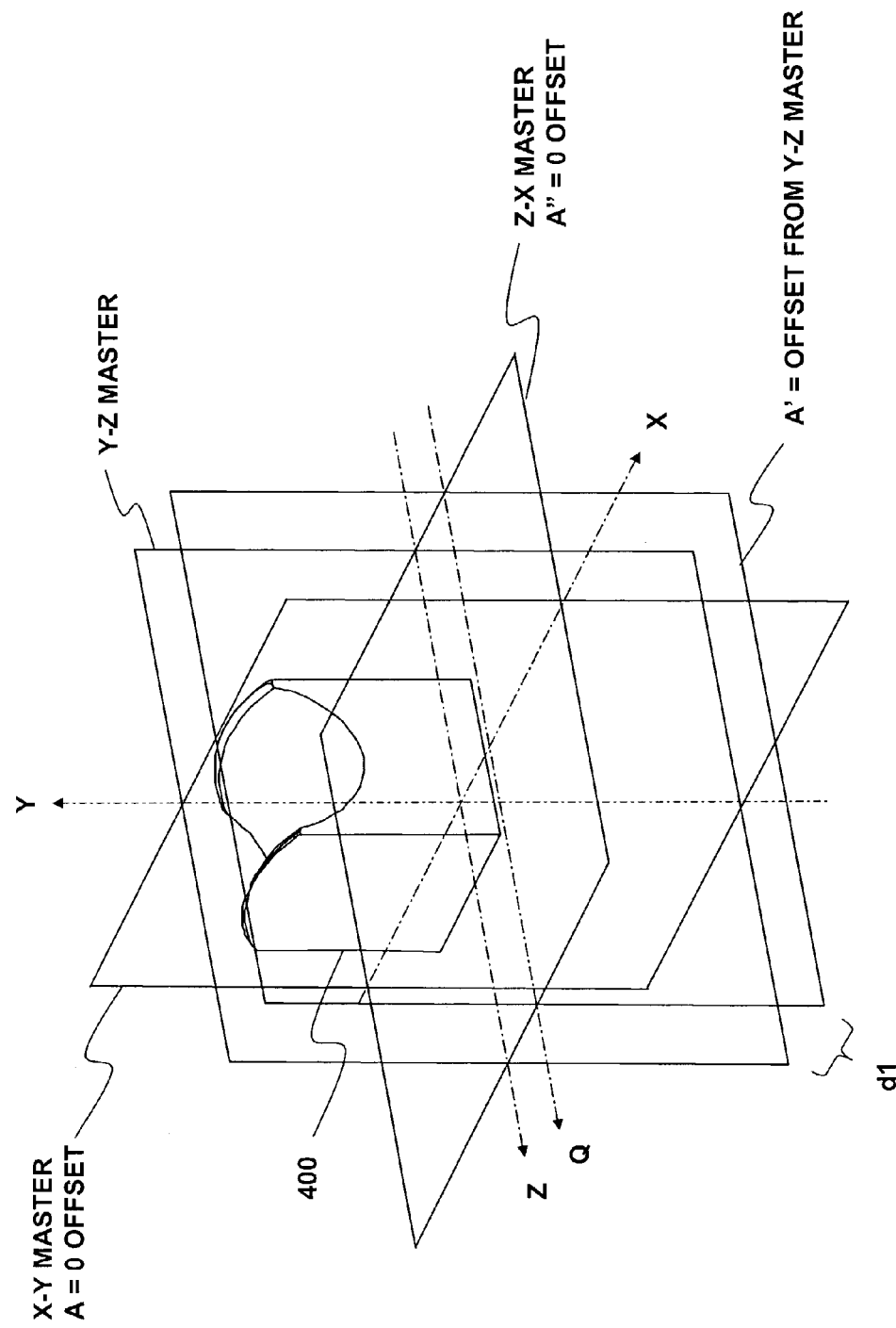
FIG. 4(a) through 4(g) are perspective views which further illustrate the exemplary process of FIGS. 3(a) through 3(c), shown along with a virtually machined workpiece positioned with respect to the set of fixed master planes shown in FIG. 2.

Referring now to FIG. 4(a), there is shown a virtually machined workpiece 400 positioned with respect to the master planes, x-y, y-z and z-x. Also shown are the positioning planes A, A' and A" associated with the master planes. It will be recalled that positioning planes A and A" have a zero offset in this example, and thus are equivalent to the x-y and z-x master planes, respectively. As can be seen, the positioning plane A' is defined as being offset and parallel to the y-z master plane by a distance $d_1$, along the positive x direction. Thereby, the Q-axis is defined by the intersection of A' and A".

Figure 4B:
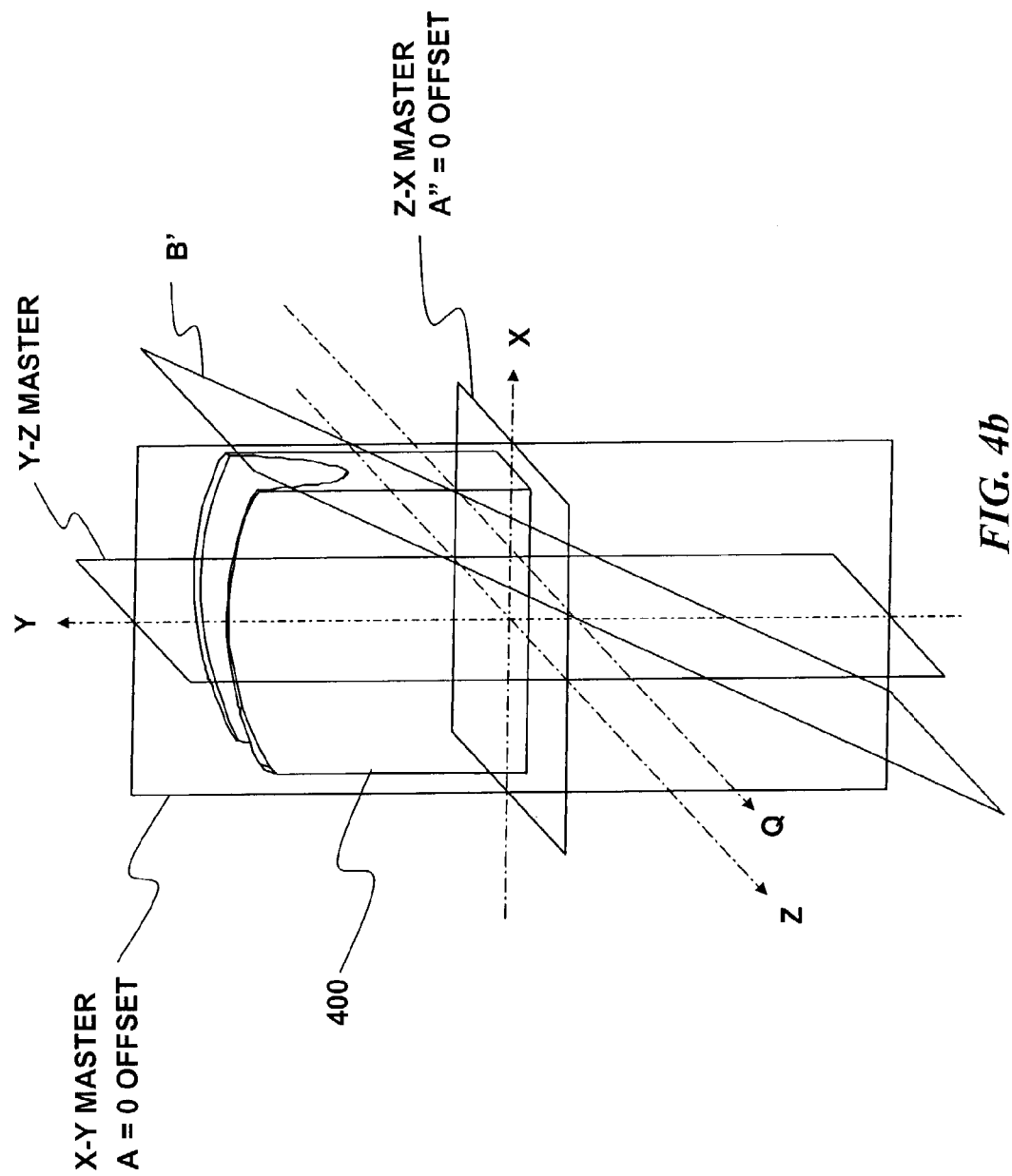
Figure 4C:
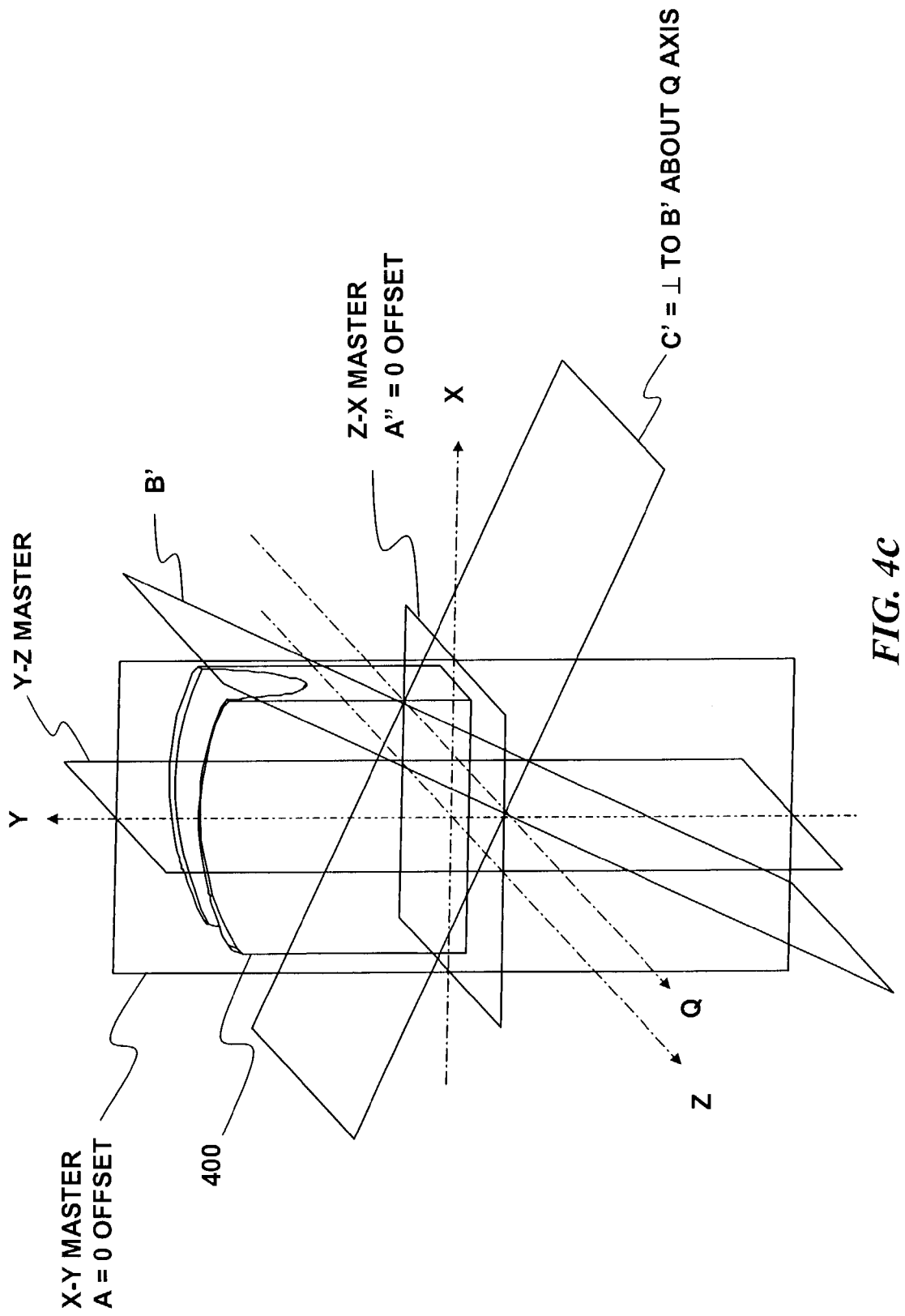
Figure 4D:
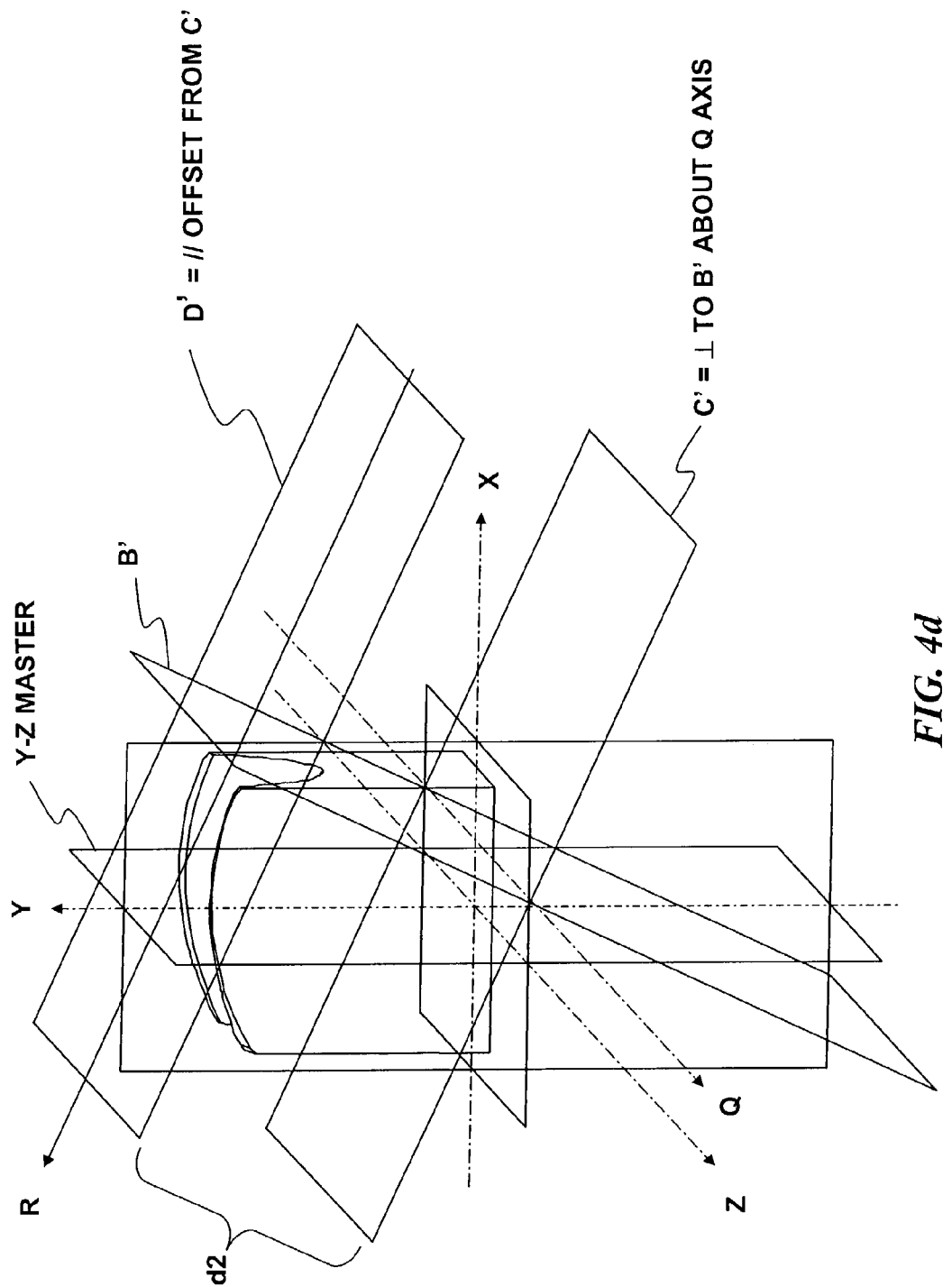

FIG. 4(b) illustrates an exemplary location for the first cutting plane, B'. As is shown, B' is rotated from the initial location at A' (not shown in FIG. 4(b)) about the Q-axis. Correspondingly, FIG. 4(c) illustrates positioning plane C' shown in its perpendicular orientation with respect to B', about the Q-axis. Then, in FIG. 4(d), positioning plane D' is shown as being perpendicular to positioning plane C', and offset a distance $d_2$ therefrom. (For ease of illustration, the master planes are not shown in FIG. 4(d).) The resulting intersection of positioning plane D' and positioning plane A (i.e., the x-y master plane in this instance) defines the R-axis.

Figure 4E:
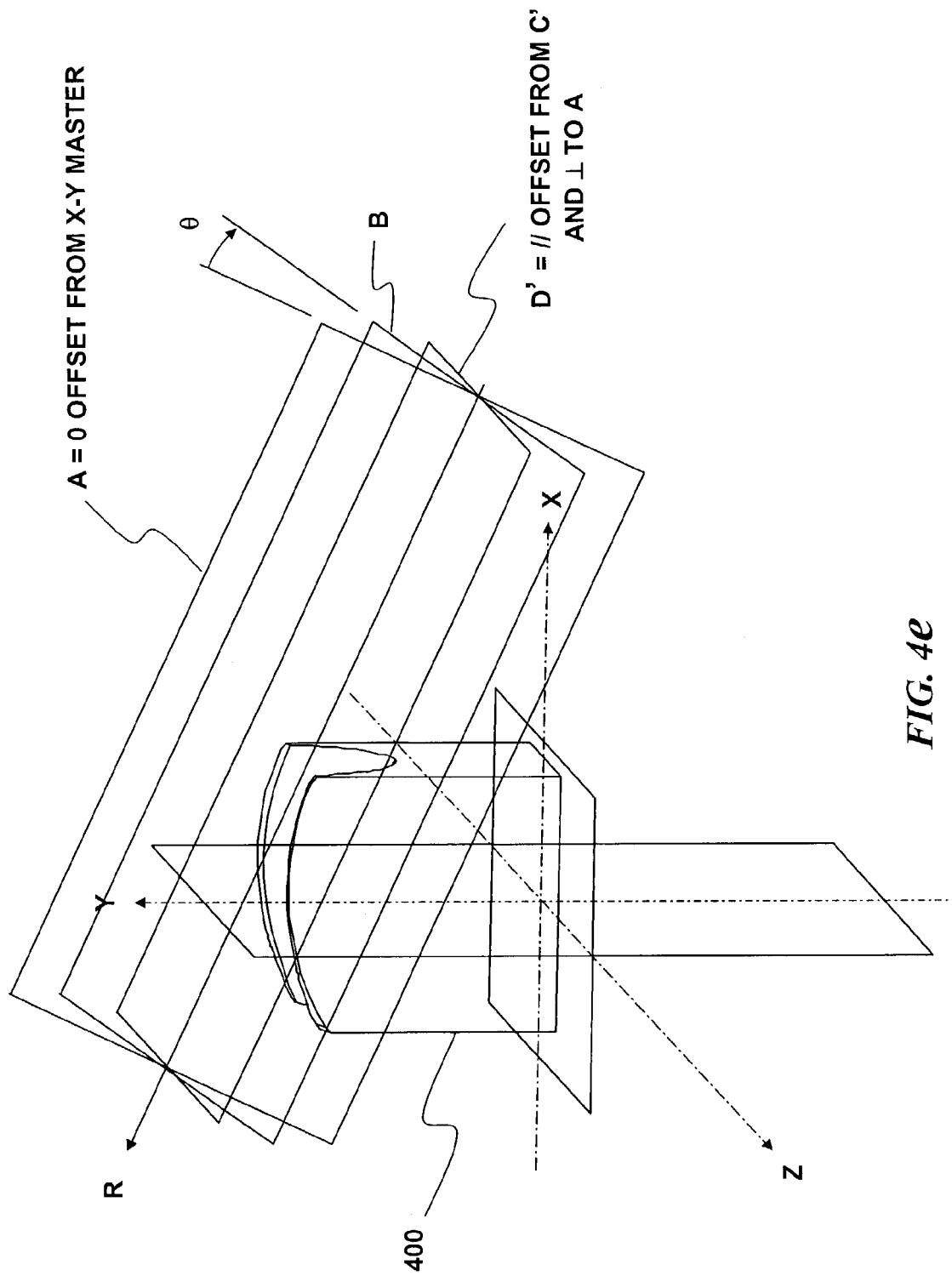

FIG. 4(e) illustrates the definition of the second cutting plane, B. It will be recalled that second cutting plane B begins in positioning plane A, and pivots about the R-axis. Thus, second cutting plane B is shown in FIG. 4(e) as being rotated from positioning plane A by an angle $\theta$.

Figure 4F:
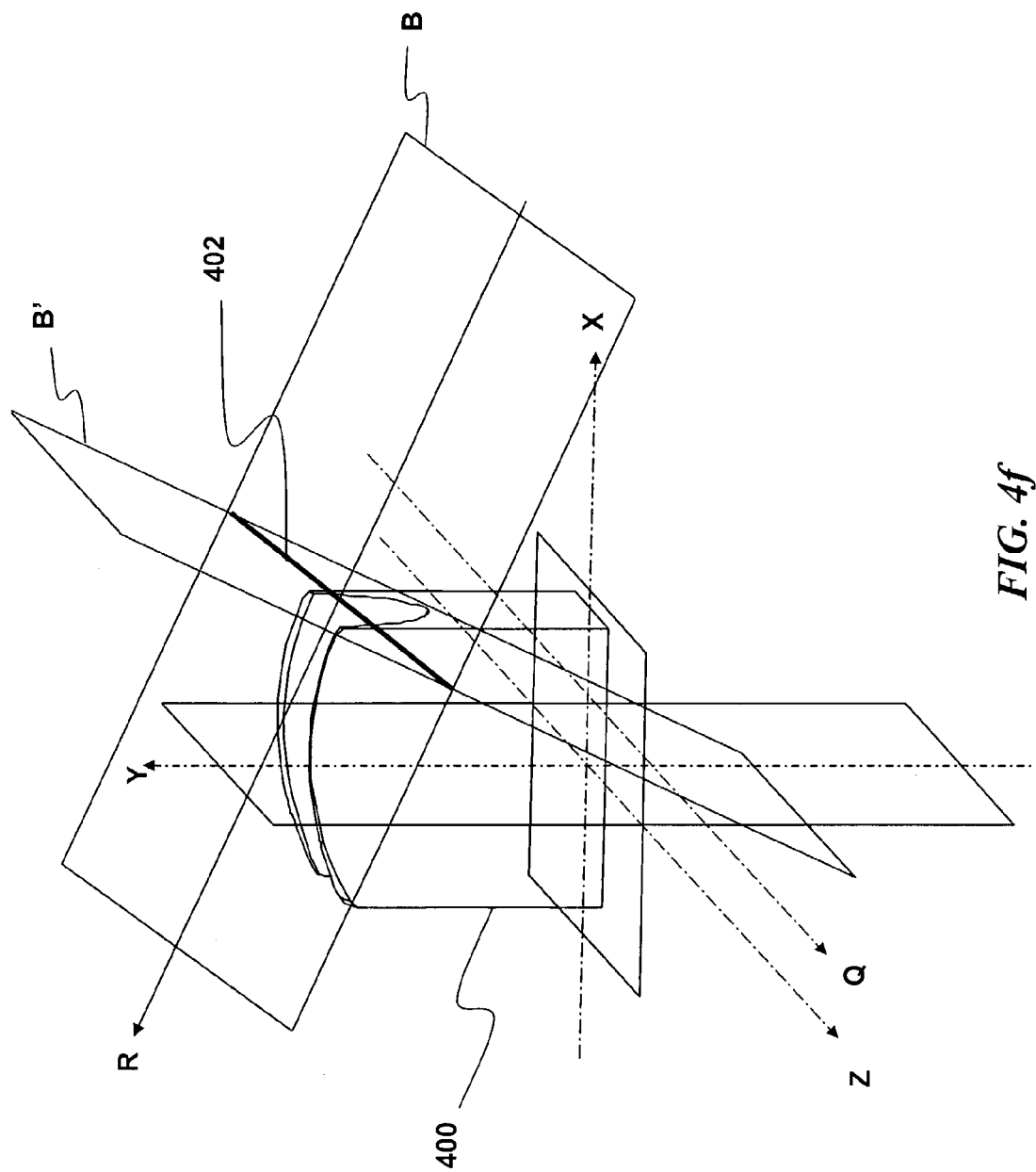
Figure 4G:
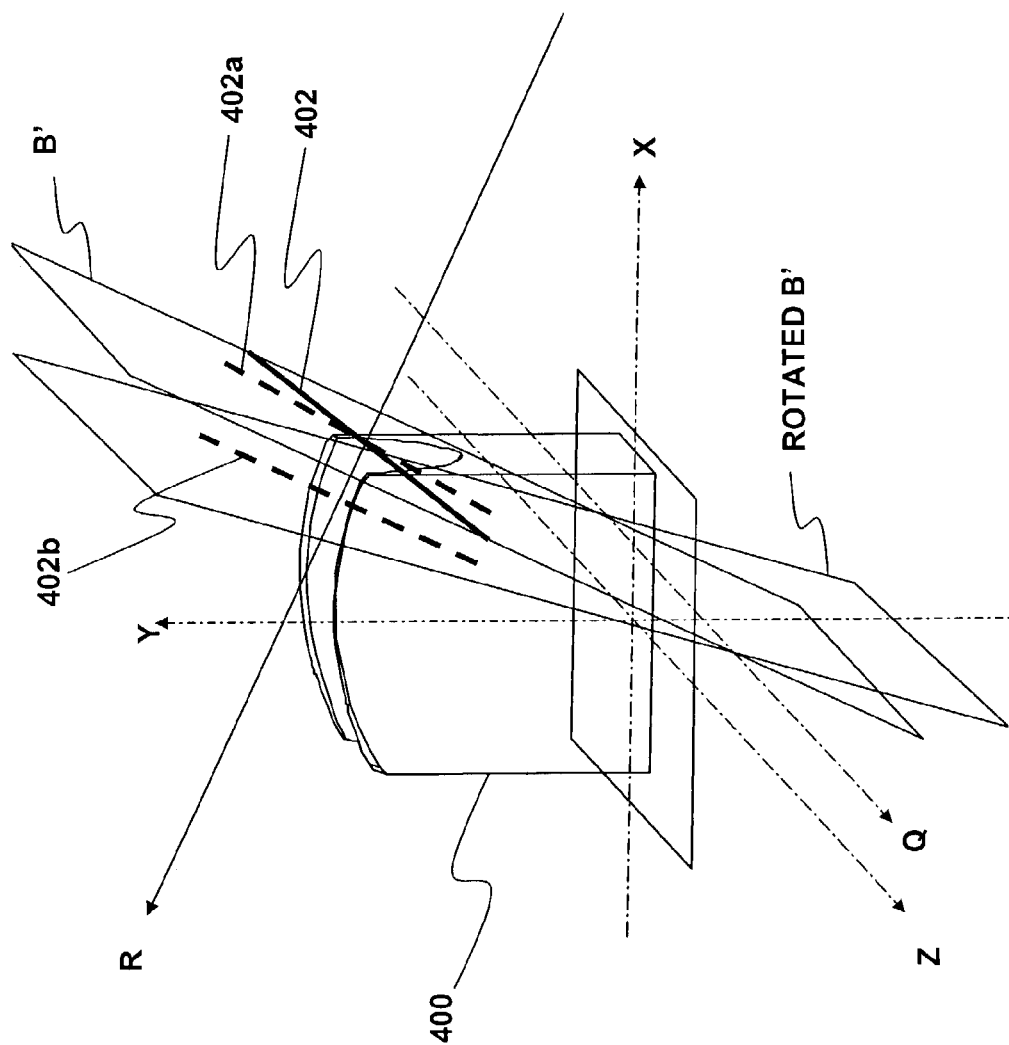

Referring now to FIG. 4(f), the intersection of the first and second cutting planes B', B is illustrated, thereby defining the inspection line 402 (shown as a darkened segment). Ultimately, the virtual length of the inspection line 402 may be controlled by using trim planes (not shown) to define boundaries for the cutting planes, as was described in FIG. 3(c). Furthermore, by changing the angle of the first cutting plane B' with respect to the Q-axis the path position of the inspection line 402 may be changed, as shown by dashed line 402a. Similarly, a change in the angle of the second cutting plane, B, results in a change in the contact angle between the inspection line 402 and the workpiece 400, as shown by dashed line 402b.

Figure 5:
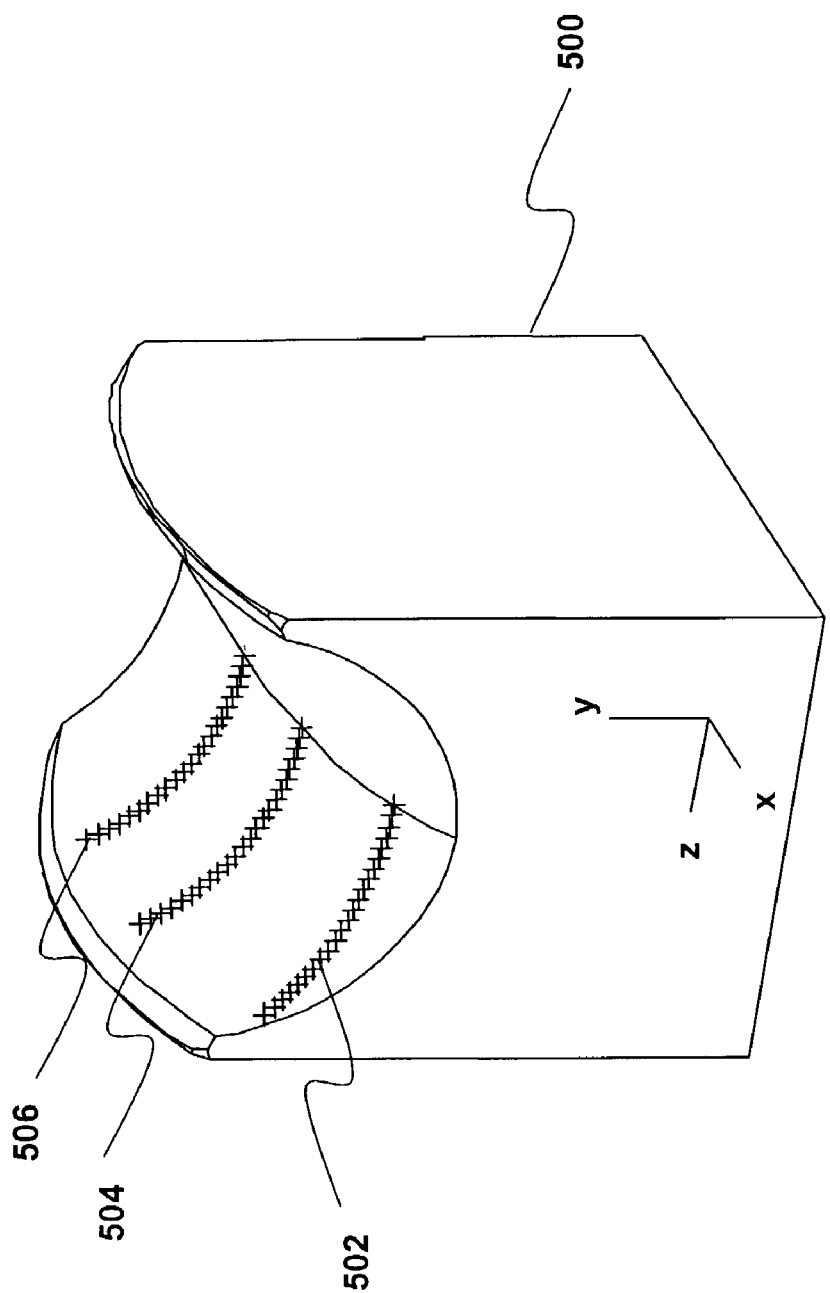
FIG. 5 illustrates a finished virtual workpiece along with sets of data inspection points taken in accordance with the virtual inspection method of FIG. 1.

Finally, FIG. 5 illustrates another example of a virtual workpiece 500 having a series of inspection data points 502 generated thereupon through the use of the above described method. The individual data points are shown as small x's along the contoured surface of the workpiece 500. Again, each data point represents the intersection of the inspection line described earlier and the surface of the workpiece 500. In studying the pattern of x's shown on the workpiece 500, it can be seen that a first group (path) of data points 504 may be taken by keeping the first cutting plane B' at a constant angle and sweeping the second cutting plane B along a determined angular path about the R-axis. Then, another group of data points 506 may be taken by adjusting the angle of the first cutting plane B' at a new constant angle and then re-sweeping B along the same angular path as above. The process can be repeated depending on the location and accuracy of the inspection required.

Through the use of the above described method, a virtual inspection process may be implemented for a virtually designed and machined part. Once the part is positioned with respect to a set of master reference (datum) planes, any point may be measured thereon by creating the inspection line from the cutting planes. The location of the inspection line is determined by the relative position of the two cutting planes which, in turn, is established by the location of positioning planes with respect to the master planes. It will be appreciated that the illustrations discussed above are exemplary in nature and should not be interpreted in any limiting manner. For example, each of the positioning planes A, A' and A" could have been offset a distance from their respective master reference planes (instead of just A' as discussed earlier).

Although the generation of the inspection line 402 is preferably implemented through the generation of the planes as discussed, those skilled in the art will appreciate that other methods may also be used in this regard. For example, since two points determine a line, the inspection line 402 could also be defined by manipulating a pair of points in a coordinate space. However, since the manipulation of planes may be accomplished by translation or pivoting about an axis, the above planar method is preferred in ultimately generating and manipulating the inspection line 402.

In addition, the creation and manipulation of the reference, position and cutting planes may be done by conventional associative means, characteristic of a "vertical modeling" system. In such a system, modeling elements such as datum planes are created in reference to a base or parent feature. The datum planes, in turn, may be used to define placement and positioning references for other modeling elements such as positioning planes or form features. However, the removal of a parent feature results in the loss of association between subsequently designed child features and the parent feature, which, in turn, results in the loss of any additional features that are subsequently associated to the child features. Thus, any modifications of certain features using vertical modeling principals may require additional effort, due to the fact that if a parent feature is edited, then all children of the parent feature need to be edited as well.

In contrast, a horizontally structured modeling of the planes allows for the independent addition or subtraction of additional features. Such a horizontally structured coordinate system facilitates model generation wherein a feature is placed and positioned independently according to subsequently constrained references (e.g., coordinate system(s), datums, and the like). If a parent feature is removed, there will be no loss of any associated child features therewith. This independence of the various modeling elements also allows for the addition, subtraction, and reordering of new or existing modeling elements. Additional information regarding horizontally structured CAD/CAM and modeling systems may be found in U.S. patent application Ser. No. 09/483,722 by Khurana et al., and U.S. Pat. No. 6,735,489, the contents of which are incorporated herein by reference in their entirety. Additional features of horizontally structured modeling are described in U.S. patent application Ser. No. 10/032,960, (Publication No. US 2002-0133803 A1) filed Oct. 24, 2001, entitled "Enhancement to Horizontally-Structured CAD/CAM Modeling", by Diane M. Landers et al. and U.S. patent application Ser. No. 10/033,163, filed Oct. 24, 2001 (Publication No. US 2002-0133267 A1) entitled "Enhancement to Horizontally Structured Manufacturing Process Modeling", by Diane M. Landers et al., the disclosures of which are incorporated by reference herein in their entirety.

The Manufacturing Process

The manufacturing process of a disclosed embodiment utilizes the horizontal CAD/CAM methods described above to ultimately generate process instructions and documentation used to control automated machinery to create a real-world part based on a horizontally-structured model. In a preferred method, "extracts" are used to generate process sheets or other instructions for each requirement for machining of the real-world part.

Figure 7:
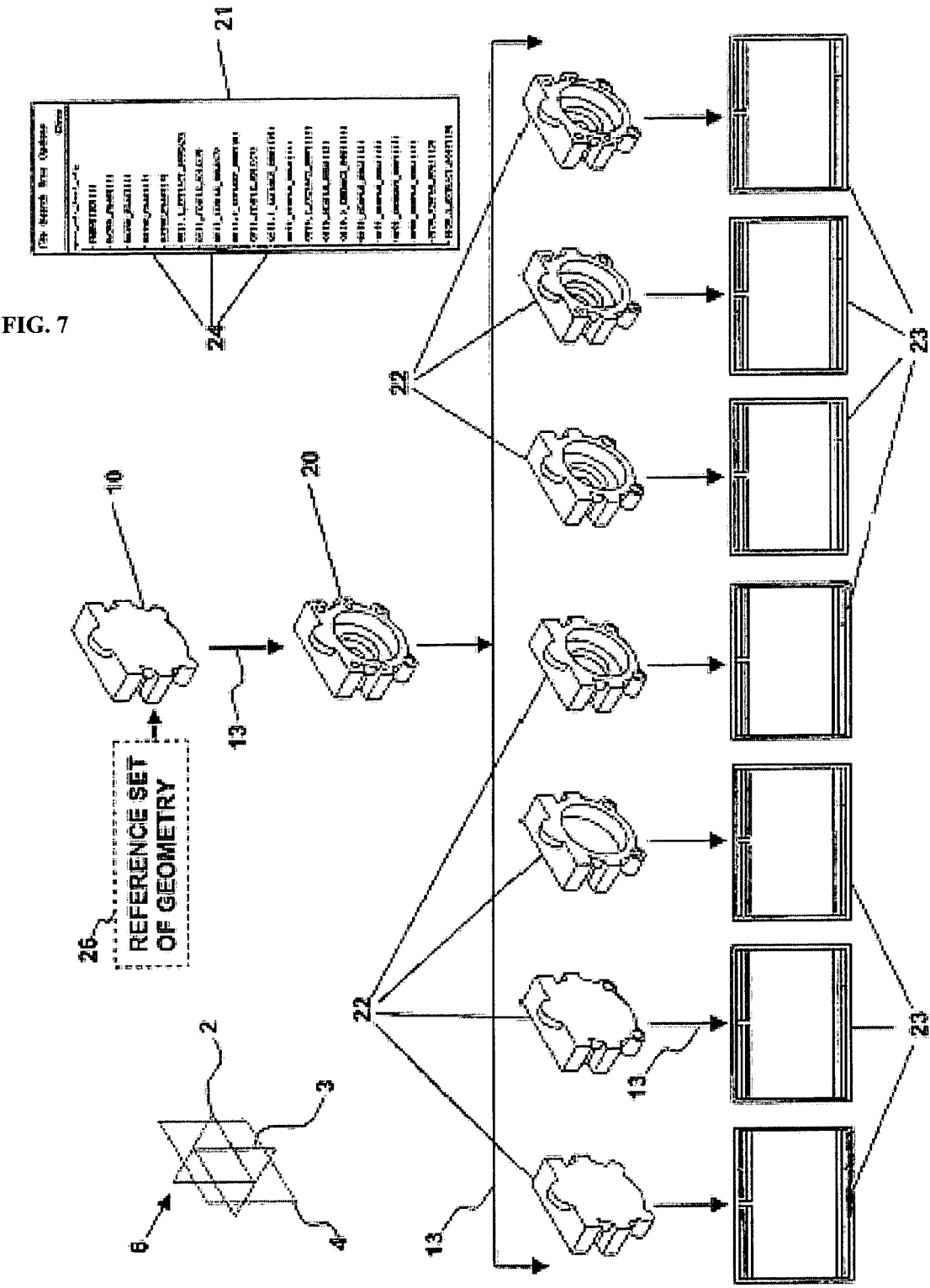
FIG. 7 is a schematic of the manufacturing process modeling method.
Figure 8:
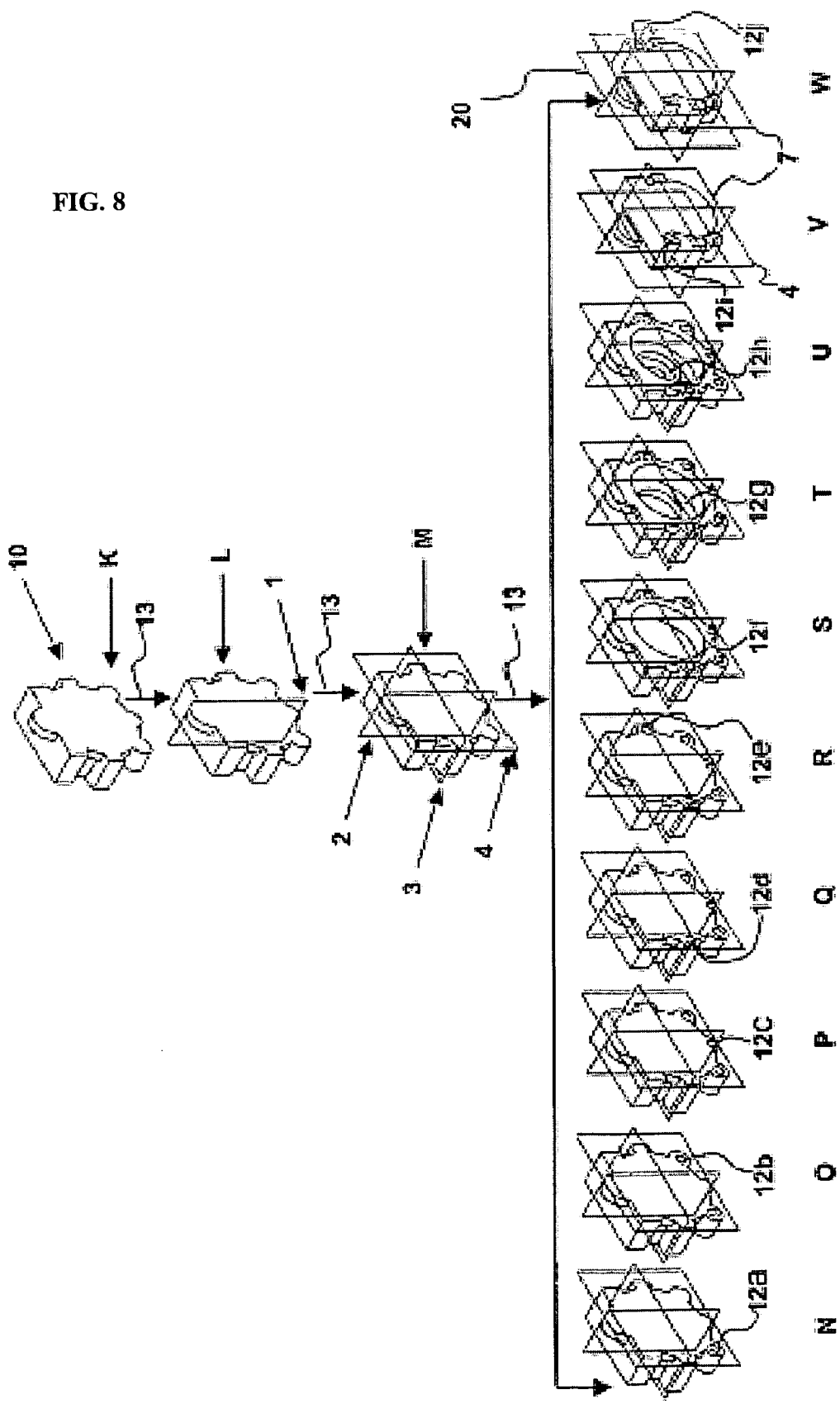
FIG. 8 depicts the virtual machining of the manufacturing process modeling method.

Referring to FIGS. 7 and 8, to initiate the manufacturing process and virtual machining, a suitable blank may be selected or created, usually a cast piece, the dimensions and measurements of which are used as the virtual blank 10 for the virtual machining of the 3-D parametric solid model with the horizontally structured manufacturing method. Alternatively, a virtual blank 10 may be selected, and a blank manufactured to match. For example, in the Unigraphics® environment, a suitable blank or component is selected, a virtual blank 10 is generated therefrom, commonly a referenced set of geometries from a model termed a reference set 26 (e.g., a built up product model of a part). From this referenced set of geometries a three-dimensional (3-D) parametric solid model termed a virtual blank 10 may be generated or created for example via the Wave link or Promotion process of Unigraphics®, which includes all of the modeled details of the completed part.

Once a virtual blank 10 has been established that corresponds to a real-world blank, a horizontally-structured 3-D parametric solid model is created in a manner that describes machining operations to be performed on the blank so as to produce the final real-world part. This horizontally structured model will be referred to as the master process model 20. It is noteworthy to appreciate that the master process model 20 depicted includes with it, but is not limited to, the virtual blank 10, added manufacturing features 12a-12j by way of virtual machining, and datum planes 2, 3, and 4 all in their respective associative relationships as exhibited from the geometries and characteristics of the reference set 26.

Figure 6:
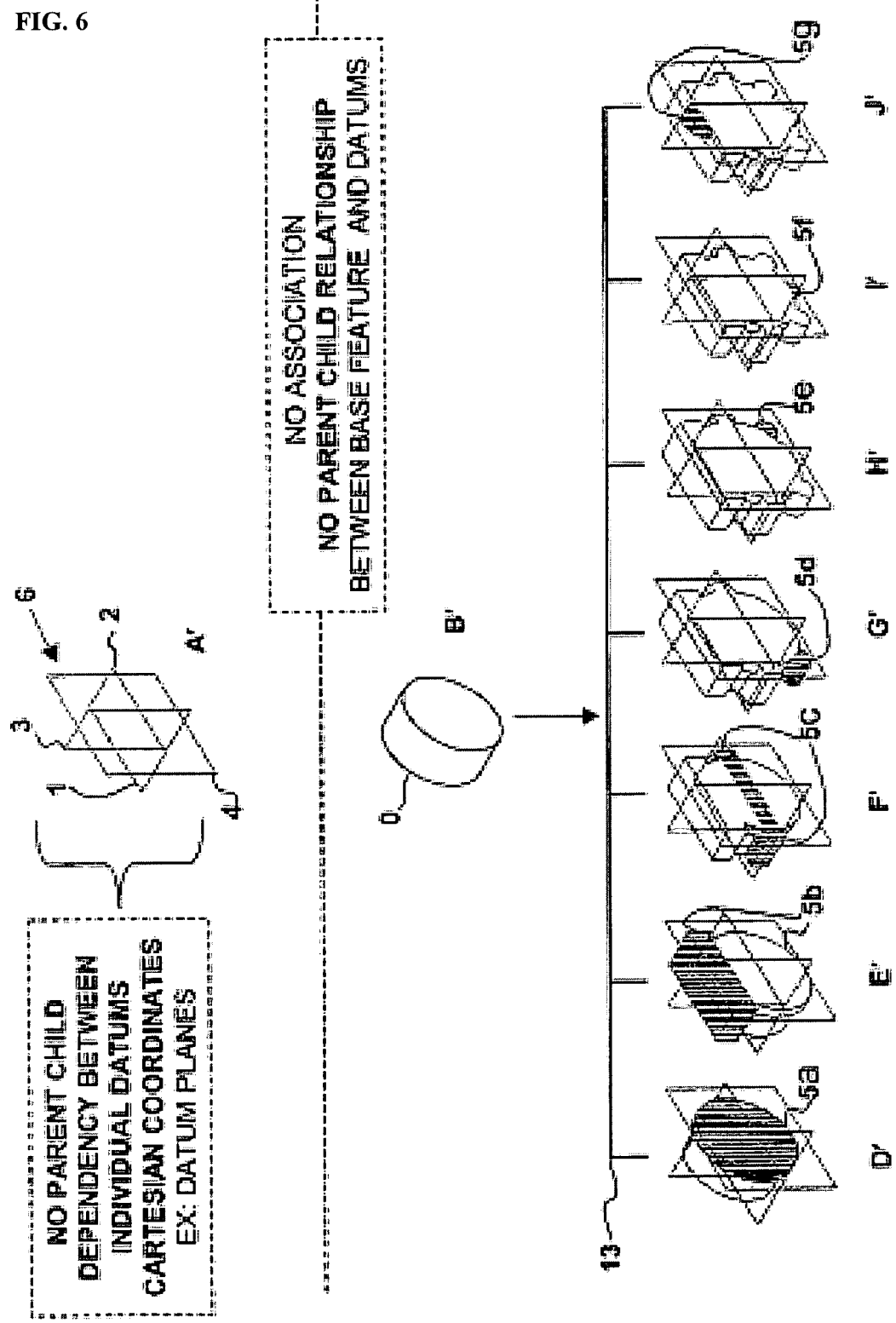
FIG. 6 is a diagram depicting an alternative embodiment of the horizontal modeling method.

FIG. 8 depicts the virtual machining process of the exemplary embodiment where manufacturing features are "machined" into the virtual blank 10. For example, at N, O, and P various holes are "drilled" into the virtual blank 10 as manufacturing features 12a, 12b, and 12c respectively. Moreover, at S a large hole is created via a boring operation at 12f. It is also noted once again, just as in the horizontally structured modeling methods discussed above, that the datum planes 2, 3, and 4 may be added as features to the 3-D coordinate system as children just like any form feature (e.g., 5a-5g) or manufacturing feature 12a-12j. These maybe added as needed to position other features, or to place them on surfaces in addition to the datum planes 2, 3, and 4. For example as shown in FIG. 6 at V, such an added plane may be created as a child of the virtual blank 10 just as the third datum plane 4 is. Moreover, at V the model has been flipped around and a face plane 7 is placed on the back as a child of the virtual blank 10. This allows manufacturing features 12i and 12j to be placed on the back of the object, in this case "counterbores" for the holes "drilled" through the front earlier.

Figure 9:
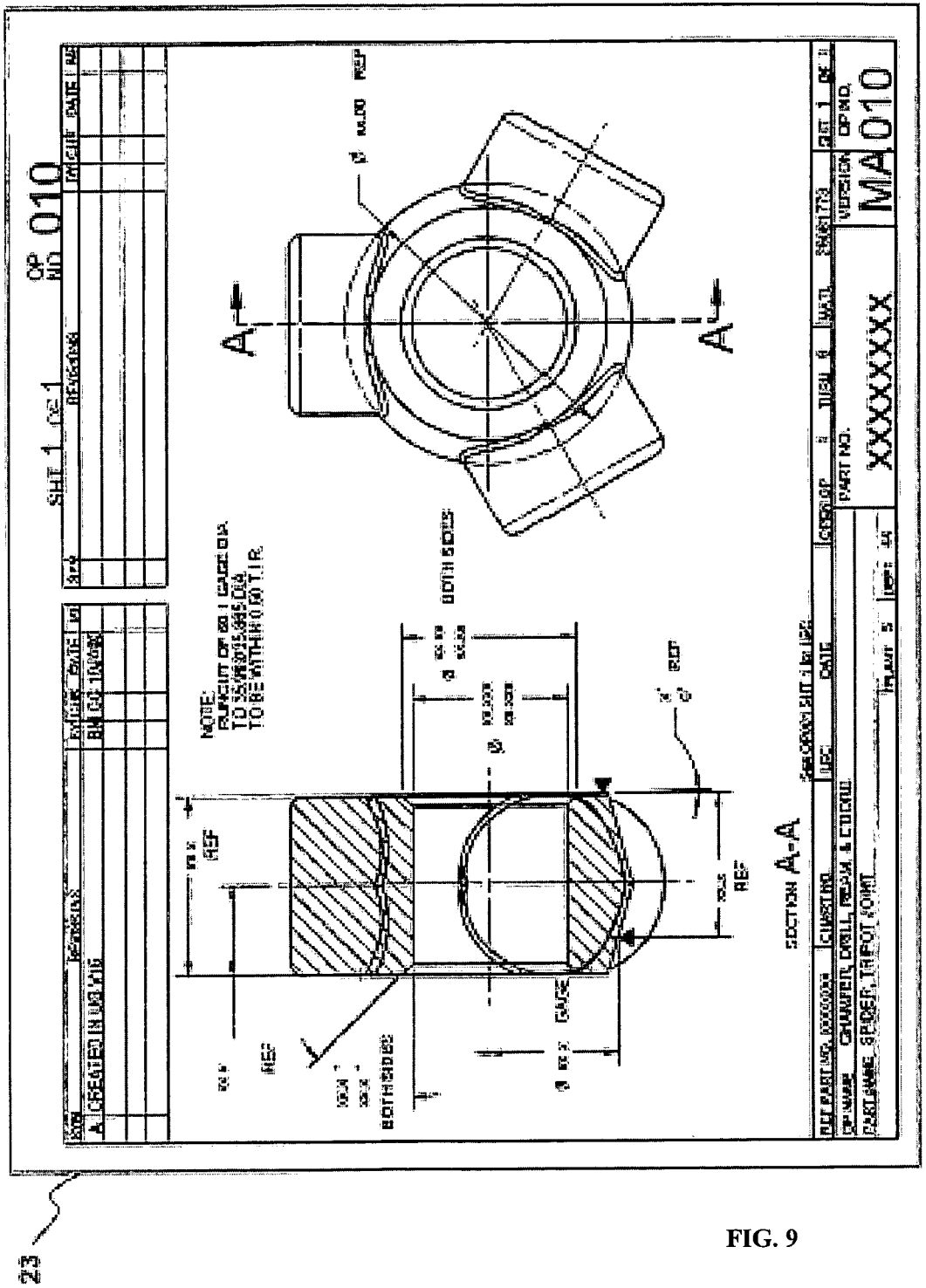
FIG. 9 shows a typical process sheet.

One may recognize the master process model 20 as the completed horizontally structured model depicted at W in FIG. 6 including all of the "machining" operations. Referring again to FIG. 6, some CAD/CAM software packages may require that the addition of the features be in a particular order, for example, in the same order as manufacture. In such a case a method for reordering the features is beneficial. In this case, the reordering method is a displayed list of features 24 that the user may manipulate, the order of features in the list corresponding to that in the master process model 20. Process instructions and documentation termed process sheets 23 are then generated from each operation. The process sheets 23 are used to depict real-time in-process geometry representing a part being machined and can be read by machine operators to instruct them to precisely machine the part. An example of a Unigraphics® process sheet 23 is shown in FIG. 9. The geometry can then be used to direct downstream applications, such as cutter paths for Computer Numerical Code (CNC) machines. In an embodiment, the software is adapted to generate such CNC code directly and thereby control the machining process with minimal human intervention, or even without human intervention at all. For example, in the Unigraphics® environment, CNC code is generated by the Manufacturing software module, which is configured to automate the machining process.

The traditional approach to manufacturing modeling is to create individual models representing the real-world component at particular operations in the manufacturing process. If a change or deletion is made in one model, it is necessary to individually update each of the other models having the same part. Using the horizontally structured modeling disclosed herein, it is now possible to generate a horizontally structured master process model 20 and generate a set of process sheets 23 that are linked thereto. Any changes to the master process model 20 are reflected in all the process sheets 23.

As seen in FIG. 7, this linkage between the master process model 20 and the process sheets 23 is preferably achieved through the use of extracted in-process models, called virtual extract(s) or extracted bodies, hereinafter denoted extract(s) 22, that are time stamped and linked to the master process model 20. Each extract 22 represents part of the manufacturing process and each is a child of the master process model 20. Any changes to the master process model 20 are automatically reflected in all the relevant extract(s) 22, but changes to the extract(s) 22 have no effect on the master process model 20. Each extract 22 is a three-dimensional snapshot of the master process model 20 at a moment in "time" of its creation. The extracts 22 created for each operation are children of the master process model 20. By changing the master process model 20, the extracts 22, and therefore, the manufacturing process is automatically updated.

The order of creation of the extracts 22 is preferably dictated by a user-friendly graphical interface 21, hereinafter referred to as a model navigation tool 21. The model navigation tool 21 will preferably allow the user to arrange the order of features through simple mouse operations so as to make manipulation of the master process model 20 as simple and intuitive as practicable. In the Unigraphics® software, a model navigation tool provides similar functionality and capability. In the example depicted at FIG. 8, a process sheet 23 is generated for each extract 22 in one-to-one correspondence. Since the master process model 20 is preferably created using the horizontally-structured methods described above, editing the master process model 20 is a simple and expedited matter of adding, editing, suppressing, or deleting individual features of the master process model 20, which through the extract(s) 22 will automatically update all the process sheet(s) 23. In a similar example, the disclosed method of generating process sheets has resulted in a 50% reduction in the time needed to create new process sheets and an 80% reduction in the time required to revise existing process sheets over the "vertical" modeling methods.

Further, this principle may be extended downstream in the manufacturing process model by utilizing the electronic data for CNC programs, tooling (i.e., cutting tool selection), and fixture design by direct transmission to the machining tools without the need for process sheets 23 and human intervention. For example, in the Unigraphics® environment, this may be achieved by creating a reference set to the particular extract 22 and including it in to a new file via virtual assembly, similar to the method employed for the creation of the virtual blank 10 discussed earlier. The extract 22 therefore, is used to create the corresponding geometry. Software must then be provided to adapt the CAD/CAM software to translate the geometry into CNC form. The method leading to generating process sheets 23 initiates with selection of a virtual blank 10 and then proceeding to add via virtual machining, manufacturing features (12a-12j) to the virtual blank 10 in a horizontally-structured manner as described earlier. Following each virtual machining operation, an extract 22 is made representing the state of the master process model 20 at that instant of the manufacturing process. The order in which the features are machined onto the real-world part is decided either through automated means or manually by the user with the model navigation tool 21. In the Unigraphics® environment an "extract" is then preferably made of the master process model 20 corresponding to each added feature representing a manufacturing position or operation. The "extraction" is accomplished through a software module provided with the CAD/CAM software, otherwise the user may create a software program for the process. In Unigraphics® software, a Modeling Module includes software configured to handle the extraction process. The process sheets 23 may then be created from the extracts 22 that are added into the Drafting Module of the Unigraphics® software.

One may think of an extract 22 as a three-dimensional "snapshot" of the assembly of the master process model 20 in progress, showing all of the manufacturing features 12a-12j up to that operation in the assembly, but none that come after it. The process sheet 23 derived from the extract 22 contains the instructions to machine the latest feature that appears at that "snapshot" in time. In the Unigraphics® environment, an extract 22 is an associative replica of master process model 20 depicting only those features, which have been added to that point in the manufacturing process. It is noteworthy to appreciate that; manufacturing features 12a-12j may thereafter be added to the extract 22 without appearing in the master process model 20, however any manufacturing features 12a-12j added to the master process model 20 will appear in the extract 22 if the particular manufacturing feature (e.g. one of 12a-12j) is directed to be added at or before the manufacturing procedure represented by the extract 22.

Referring to FIGS. 7 and 9, there is shown a typical process sheet 23. A process sheet 23 is a document defining the sequence of operations, process dimensions, and listing of equipment, tools, and gauges required to perform an operation. Manufacturing personnel utilize process sheets to obtain the detailed information required to manufacture and inspect the components depicted thereon. Each process sheet 23 includes, but is not limited to, both graphics and text. The graphics may include the dimensional characteristics of the part for the particular portion of the manufacturing process, the text contains various data identifying the part and operation and noting revisions. In the example shown in FIG. 9, we see a part called a "Tripod Joint Spider." The operation that this process sheet depicts is number 10 in a set of operations and is described as a "drill, chamfer and ream" and it may be seen by the graphics that a 41 mm hole is to be drilled through the part and chamfered out 48 deg from the central axis of the hole (or 42 deg from the surface of the spider joint) on both sides.

Enhancement to Horizontally Structured Manufacturing Process Modeling

A first alternative embodiment of the manufacturing process is disclosed which utilizes the horizontal CAD/CAM modeling methods described above to ultimately generate process instructions and documentation used to control automated machinery to create a real-world part based on a horizontally-structured model. In a preferred method, process model "extracts" are used to generate process sheets or other instructions for each procedure to machine the real-world part.

Figure 10:
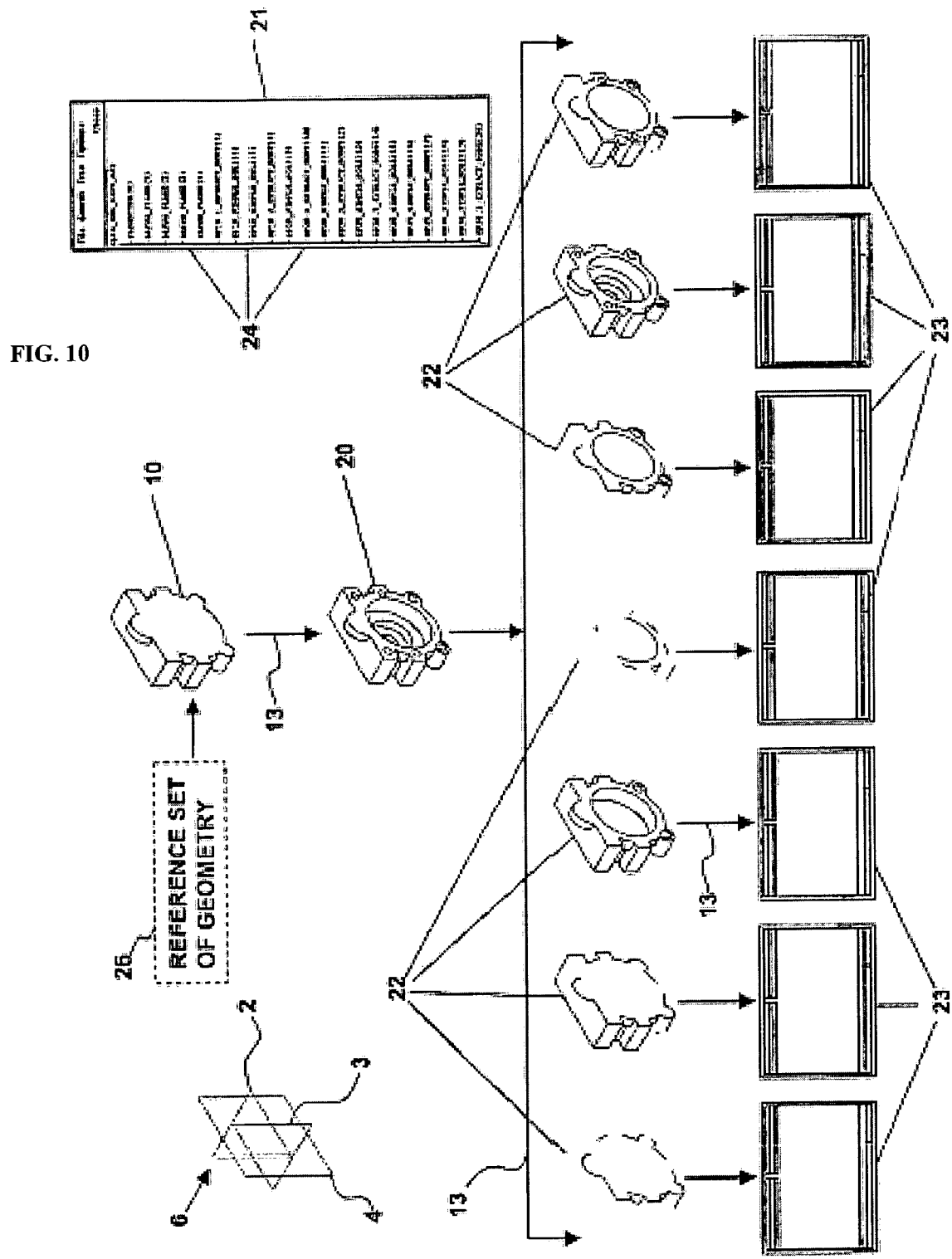
FIG. 10 is a schematic of the enhanced horizontally structured manufacturing process.

Referring to FIG. 10, to initiate the manufacturing process and virtual machining, once again, a suitable blank may be selected or created, for example, a cast piece, the dimensions and measurements of which, are used as the virtual blank 10 for the virtual machining of the 3-D parametric solid model with the horizontally structured manufacturing method. Alternatively, a virtual blank 10 may be selected, and a blank could be manufactured to match it. This alternative may prove be less desirable as it would incorporate additional machining which would not be necessary if the virtual blank 10 initiates with the blank's dimensions. It is nonetheless stated to note that the method disclosed includes, and is not limited to a variety of approaches for establishing the blank and a representative virtual blank 10 for the model.

For example, in the Unigraphics® environment, a suitable blank or component is selected. A virtual blank 10 is generated therefrom, commonly a referenced set of geometries from a model termed a reference set 26 shown in FIG. 11 (e.g., a built up product model of a part). From this referenced set of geometries a three-dimensional virtual blank 10 model may be generated or created for example via the Wave link or Promotion process of Unigraphics®, which includes all of the modeled details of the completed part.

Once a virtual blank 10 has been established that corresponds to a real-world blank, a horizontally-structured 3-D parametric solid model is generated or created in a manner that describes machining operations to be performed on the blank so as to produce the final real-world part. This horizontally structured model will be referred to as the master process model 20. It is noteworthy to appreciate that the master process model 20 depicted includes with it, but is not limited to, the virtual blank 10, added manufacturing features 12*a*-12*j* by way of virtual machining, and datum planes 2, 3, and 4 all in their respective associative relationships as exhibited from the geometries and characteristics of the reference set 26.

The master process model 20, logically, is a child of the reference set 26 and virtual blank 10, thereby ensuring that if a design change is implemented in the product model utilized for the reference set 26, such a change flows through to the master process model 20 and manufacturing process. Unique to this embodiment, is the lack of a mandatory associative relationship among the master process model 20 and the datum planes 2, 3, and 4 which comprise the reference 3-D coordinate system 6 with respect to which, the form features and manufacturing features are positioned and oriented. Moreover, also unique to this embodiment, is the absence of a mandatory associative relationship among the datum planes 2, 3, and 4 themselves. This independence, as with the modeling described above provides significant flexibility in the manufacturing process by allowing a user to interchangeably apply various features to a master process model. Likewise, interchangeable master process models may be generated without impacting the particular features or datum planes utilized.

Referring once again to FIG. 8, the virtual machining process of the exemplary embodiment where manufacturing features are "machined" into the virtual blank 10 is depicted. For example, at N, O, and P various holes are "drilled" into the virtual blank 10 as manufacturing features 12*a*, 12*b*, and 12*c* respectively. Moreover, at S a large hole is created via boring operation at 12*f*. It is also noted once again, just as in the horizontally structured modeling methods discussed above, that the datum planes 2, 3, and 4 may be added as features to the 3-D coordinate system as children just like any form feature (e.g., 5*a*-5*g*) or manufacturing feature 12*a*-12*j*. These may be added as needed to position other features, or to place them on surfaces in addition to the datum planes 2, 3, and 4. For example as shown in FIG. 8 at V, such an added plane may be created as a child of the virtual blank 10 just as the third datum plane 4 is. Moreover, at V the model has been flipped around and a face plane 7 is placed on the back as a child of the virtual blank 10. This allows manufacturing features 12*i* and 12*j* to be placed on the back of the object, in this case "counter-bores" for the holes "drilled" through the front earlier.

Once again, one may recognize the master process model 20 as the completed horizontally structured model depicted at W in FIG. 8 including all of the "machining" operations. Referring again to FIG. 10, similar to the horizontally structured modeling disclosure above, some CAD/CAM software packages may require that the addition of the manufacturing features 12*a*-12*j* to be in a particular order, for example, in the same order as manufacture. In such a case, a method for reordering the features may prove beneficial. In this case, the reordering method is a displayed list of features 24 that the user may manipulate, the order of features in the list corresponding to that in the master process model 20. Here again, as stated earlier, process instructions and documentation termed process sheets 23 are then generated from each operation. The process sheets 23 are used to depict real-time in-process geometry representing a part being machined and can be read by machine operators to instruct them to precisely machine the part. Once again, an example of a Unigraphics® process sheet 23 is shown in FIG. 9. The geometry can then be used to direct downstream applications, such as cutter paths for Computer Numerical Code (CNC) machines. In a preferred embodiment, the software is adapted to generate such CNC code directly and thereby control the machining process with minimal human intervention, or even without human intervention at all.

The traditional approach to manufacturing modeling was to create individual models representing the real-world component at particular operation in the manufacturing process. If a change or deletion was made in one model, it was necessary to individually update each of the other models having the same part. Using the horizontally structured modeling disclosed herein, it is now possible to generate a horizontally structured master process model 20 and generate a set of process sheets 23 that are linked thereto. Any changes to the master process model 20 are reflected in all the process sheets 23.

Figure 11:
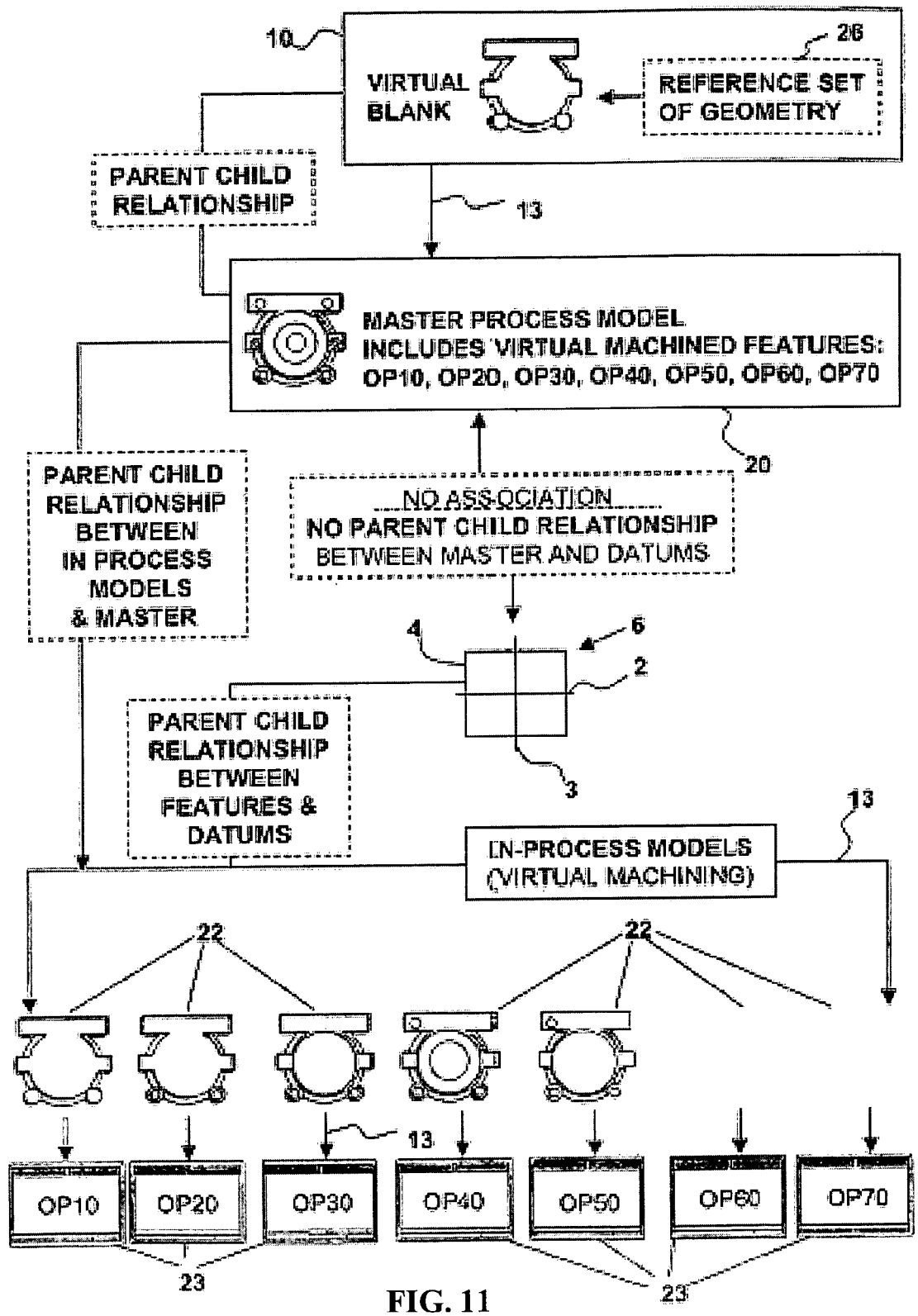
FIG. 11 is a diagram depicting the relationships among the elements of the manufacturing process model for the enhanced manufacturing process modeling.

As seen in FIG. 10, in Unigraphics® software, this linkage between the master process model 20 and the process sheets 23 is preferably achieved through the use of extracted in-process models, called virtual extract(s) or extracted bodies, hereinafter denoted extract(s) 22, that are time stamped and linked to the master process model 20. Referring also to FIG. 11, each extract 22 is also a three dimensional solid model and represents the part under fabrication at a particular operation or time in the manufacturing process. Each extract 22 is a child of the master process model 20. Any changes to the master process model 20 are automatically reflected in all the relevant extract(s) 22, but changes to the extract(s) 22 have no effect on the master process model 20. It should be noted that in an exemplary embodiment, each extract 22 need not necessarily exhibit an associative relationship with the datum planes 2, 3, and 4 respectively nor the manufacturing features 12*a*-12*j* respectively. An advantage of the disclosed embodiment then is, in the realization that any changes to the datum planes 2, 3, and 4 as well as the manufacturing features 12a-12j are independent of the relevant extract(s) 22 and vice versa. An additional characteristic of the exemplary embodiment is that each of the manufacturing features 12a-12j, now maintain associative relationships, in this case, parent/child relationships with the corresponding datum planes 2, 3, and 4. Therefore, changes to the datum planes are automatically reflected in all the relevant manufacturing features 12a-12j, but changes to the manufacturing features 12a-12j have no effect on the various datum planes. Once again, the manufacturing features 12a-12j may, but need not necessarily, exhibit an associative relationship among themselves. This separation of the associative relationships of master process model 20 and extracts 22 from datum planes 2, 3, and 4 and manufacturing features 12a-12j is one characteristic, which enables a user now to effectively manipulate the various elements of the manufacturing process models to facilitate easy substitutions into or out of a model.

Continuing with FIG. 10, each extract 22 is a three-dimensional "snapshot" of the master process model 20 at a moment in "time" of its creation in the manufacturing process. The extracts 22 created for each operation are children of the master process model 20. By changing the master process model 20, the extracts 22, and therefore, the manufacturing process is automatically updated.

The order of creation of the extracts 22 is preferably dictated by a user-friendly graphical interface 21, hereinafter referred to as a model navigation tool 21. The model navigation tool 21 will preferably allow the user to arrange the order of features through simple mouse operations so as to make manipulation of the master process model 20 as simple and intuitive as practicable. In the Unigraphics® software, a model navigation tool provides similar functionality and capability. A process sheet 23 is generated for each extract 22. In the example depicted in FIG. 10, a process sheet 23 is generated for each extract in one-to-one correspondence. Since the master process model 20 is preferably created using the horizontally-structured methods described above, editing the master process model 20 is a simple and expedited matter of adding, editing, suppressing, or deleting individual features of the master process model 20, which, through the extract(s) 22, will automatically update all the process sheet (s) 23.

Further, this principle may be extended further downstream in the manufacturing process model by utilizing the electronic data for CNC programs, tooling (i.e., cutting tool selection), and fixture design by direct transmission to the machining tools without the need for process sheets 23 and human intervention. For example, in the Unigraphics® environment, such automation may be achieved by creating a reference set (analogous to the reference set 26) to the particular extract 22 and including it in a new file via virtual assembly, similar to the method employed for the creation of the virtual blank 10 discussed earlier. The extract 22 therefore, is used to create the corresponding geometry. Software must then be provided to adapt the CAD/CAM software to translate the geometry into CNC form.

The method of generating process sheets 23 initiates with selection a virtual blank 10 and then proceeding to add manufacturing features 12a-12j (FIG. 8) to the virtual blank 10 in a horizontally-structured manner as described earlier. Following each virtual machining operation, an extract 22 is made representing the state of the master process model 20 at that instant of the manufacturing process. The order in which the features are to be machined into the real-world part is decided upon either through automated means or manually by the user with the model navigation tool 21. In the Unigraphics® environment an "extract" is then preferably made of the master process model 20 corresponding to each added feature representing a manufacturing position or operation. The "extraction" is accomplished through a software module provided with the CAD/CAM software, otherwise the user may develop software to program the process. In Unigraphics® software, the Modeling Module includes software to handle the extraction process. Once again, the process sheets 23 may then be created from the extracts 22 that are added into the Drafting Module of the Unigraphics® software.

Once again, one may think of an extract 22 as a "snapshot" of the assembly of the master process model 20 in progress, showing all of the manufacturing features (e.g. one or more of 12a-12j (FIG. 8)) up to that point in the assembly, but none that come after it. The process sheet 23 derived from the extract 22 contains the instructions to machine the latest feature that appears at that "snapshot" in time. In the Unigraphics® environment, an extract 22 is an associative replica of master process model 20 depicting only those features, which have been added to that point in the manufacturing process. It is noteworthy to appreciate that, manufacturing features 12a-12j may be added to the extract 22 without appearing in the master process model 20, however any features added to the master process model 20 will appear in the extract 22 if the feature is directed to be added at or before the manufacturing procedure represented by the extract 22.

Referring to FIG. 10, there is shown a typical process sheet 23. Once again, a process sheet 23 is a document defining the sequence of operations, process dimensions, and listing of equipment, tools, and gauges required to perform an operation. Manufacturing personnel utilize process sheets to obtain the detailed information required to manufacture and inspect the components depicted thereon. Each process sheet 23 includes, but is not limited to, both graphics and text. Again, the graphics may include, but not be limited to, the dimensional characteristics of the part for the particular portion of the manufacturing process, the text may include, but not be limited to various data identifying the part and operation and noting revisions, and corresponding tooling fixtures and gauges, and the like. Once again, an example is shown in FIG. 9, with the same characteristics as described earlier.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. In a computer system having a memory, a graphical user interface including a display and a selection device, a method for verifying a mathematical-based, virtual machining application having a navigation tool on the display, the method comprising:
retrieving a list of features for the navigation tool, the list of features representing virtual machining operations;
displaying a virtually machined workpiece in the display;
generating a virtual inspection line on the display in response to a selection signal indicative of the selection device selecting from the list of features, wherein generating the virtual inspection line includes:
defining a set of master reference planes in the display;
defining a set of positioning planes with respect to said set of master reference planes; and
defining a pair of intersecting cutting planes from said set of positioning planes;
wherein said inspection line is defined at the intersection of said pair of intersecting cutting planes;
generating a signal from the selection device to position the virtual inspection line to intersect the workpiece, thereby defining a virtual inspection point;
generating signal from the selection device to generate a set of trim planes to establish defined boundaries for the cutting planes, wherein a length of the virtual inspection line may be controlled by the defined boundaries; and
sweeping said inspection line through a selected area of the workpiece, thereby collecting virtual inspection data for verifying the virtually machined workpiece; and
collecting the virtual inspection data in the memory of the computer system.

2. The method of claim 1, wherein said pair of intersecting cutting planes further comprises:
a first cutting plane, said first cutting plane being rotatable about a first axis; and
a second cutting plane, said second cutting plane being rotatable about a second axis;
wherein rotation of said first cutting plane determines a path position of said inspection line, and rotation of said second cutting plane determines a contact angle between said inspection line and the workpiece.

3. The method of claim 2, wherein said first axis is defined by the intersection between a first positioning plane and a second positioning plane.

4. The method of claim 3, wherein said second axis is defined by the intersection between a third positioning plane and a fourth positioning plane, said fourth positioning plane being perpendicular to said first cutting plane.

5. A computer-readable medium having computer-executable instructions for performing a virtual inspection of a virtually machined workpiece method, comprising:
selecting the virtually machined workpiece on a computer display;
virtually inspecting the workpiece by generating a virtual inspection line, said inspection line being used to intersect with the workpiece to define a virtual inspection point; wherein said inspection line is swept through a selected area of the workpiece, thereby collecting virtual inspection data for verifying the virtually machined workpiece, wherein generating the virtual inspection line includes:
defining a set of master reference planes;
defining a set of positioning planes with respect to said set of master reference planes; and
defining a pair of intersecting cutting planes from said set of positioning planes;
wherein said inspection line is defined at the intersection of said pair of interecting cutting planes;
generating a set of trim planes to establish defined boundaries for the cutting planes, wherein a length of the virtual inspection line may be controlled by the defined boundaries; and
providing a list of features on a navigation tool, presenting machine operations including positioning the inspection line along the workpiece for collecting said virtual inspection data.

6. The computer-readable medium of claim 5, wherein said pair of intersecting cutting planes further comprises:
a first cutting plane, said first cutting plane being rotatable about a first axis; and
a second cutting plane, said second cutting plane being rotatable about a second axis;
wherein rotation of said first cutting plane determines a path position of said inspection line, and rotation of said second cutting plane determines a contact angle between said inspection line and the workpiece.

7. The computer-readable medium of claim 6, wherein said first axis is defined by the intersection between a first positioning plane and a second positioning plane.

8. The computer-readable medium of claim 7, wherein said second axis is defined by the intersection between a third positioning plane and a fourth positioning plane, said fourth positioning plane being perpendicular to said first cutting plane.

9. An article of manufacture, comprising:
a computer-readable medium having stored thereon computer executable instructions for storing in a memory of a computer having a display, the instructions including:
generating a virtually machined workpiece on the display;
generating a virtual inspection line, including
defining a set of master reference planes;
defining a set of positioning planes with respect to said set of master reference planes; and
defining a pair of intersecting cutting planes from said set of positioning planes;
wherein said inspection line is defined at the intersection of said pair of intersecting cutting planes;
generating a path through which the inspection line sweeps on the display;
generating a contact angle between said inspection line and the virtually machined workpiece on the display,
wherein said inspection line being used to intersect with the workpiece to define a virtual inspection point; wherein said inspection line is swept through a selected area of the workpiece, thereby collecting virtual inspection data for verifying the virtually machined workpiece; and
generating a set of trim planes to establish defined boundaries for the cutting planes, wherein a length of the virtual inspection line may be controlled by the defined boundaries.

10. The article of manufacture of claim 9, wherein said instructions for defining a pair of intersecting cutting planes from said set of positioning planes comprise:

generating a first cutting plane, said first cutting plane being rotatable about a first axis; and generating a second cutting plane, said second cutting plane being rotatable about a second axis;

wherein rotation of said first cutting plane determines the path position of said inspection line, and rotation of said second cutting plane determines the contact angle between said inspection line and the workpiece.

11. The article of manufacture of claim 10, wherein said first axis is defined by the intersection between a first positioning plane and a second positioning plane.

12. The article of manufacture of claim 11, wherein said second axis is defined by the intersection between a third positioning plane and a fourth positioning plane, said fourth positioning plane being perpendicular to said first cutting plane.

13. The method of claim 2 further comprising:

generating a signal from the selection device to rotate said first cutting plane;

generating a signal from the selection device to sweep the inspection line through the workpiece to collect virtual inspection data along the inspection line path defined by the rotation of said first cutting plane; and generating a signal from the selection device to rotate said second cutting plane; and generating a signal from the selection device to sweep the inspection line through the workpiece to collect virtual inspection data along the inspection line path defined by a contact angle between said inspection line and the workpiece.

14. The computer-readable medium of claim 6 wherein providing the list of features to position the inspection line along the workpiece for collecting said virtual inspection data, comprises:

rotating said first cutting plane to create a path along which the inspection line can sweep to collect virtual inspection data; and rotating said second cutting plane to create a contact angle between said inspection line and the workpiece, the contact angle defining a second line along which the inspection line can sweep to collect virtual inspection data.

* * * * *